(12) United States Patent
Korikov et al.

(10) Patent No.: US 9,154,598 B2
(45) Date of Patent: Oct. 6, 2015

(54) CALL INTERCEPTION AT A BASE STATION

(75) Inventors: Andrei Korikov, Saint Brice Sous Foret (FR); Sylvain Lacroix, Paris (FR)

(73) Assignee: Thomson Licensing, Issy-les-Moulineaux (FR)

( * ) Notice: Subject to any disclaimer, the term of this patent is extended or adjusted under 35 U.S.C. 154(b) by 459 days.

(21) Appl. No.: 12/450,218

(22) PCT Filed: Mar. 5, 2008

(86) PCT No.: PCT/FR2008/050373
§ 371 (c)(1),
(2), (4) Date: Mar. 1, 2010

(87) PCT Pub. No.: WO2008/116999
PCT Pub. Date: Oct. 2, 2008

(65) Prior Publication Data
US 2010/0167761 A1    Jul. 1, 2010

(30) Foreign Application Priority Data

Mar. 16, 2007 (FR) .................................... 07 53873
Sep. 19, 2007 (FR) .................................... 07 57663

(51) Int. Cl.
*H04W 4/00* (2009.01)
*H04M 1/725* (2006.01)
(Continued)

(52) U.S. Cl.
CPC .......... *H04M 1/72502* (2013.01); *H04M 1/652* (2013.01); *H04M 1/642* (2013.01); *H04M 2250/08* (2013.01)

(58) Field of Classification Search
CPC ............ H04M 1/642; H04M 2250/08; H04M 1/72502; H04M 1/652

USPC .......................................... 455/462, 410, 426
See application file for complete search history.

(56) References Cited

U.S. PATENT DOCUMENTS 4,593,155 A * 6/1986 Hawkins ........................ 455/411
4,731,813 A * 3/1988 Schroeder ..................... 455/410
4,736,404 A * 4/1988 Anglikowski et al. ........ 455/411
(Continued)

FOREIGN PATENT DOCUMENTS

CA    2133859    10/1994
EP    0730364    9/1996
(Continued)

OTHER PUBLICATIONS

Search Report Dated Aug. 21, 2008.
(Continued)

*Primary Examiner* — Charles Shedrick
(74) *Attorney, Agent, or Firm* — Myers Wolin LLC

(57) ABSTRACT

A base station, for communication with a portable communication device and for connection to a communication network, able to receive a number from a portable communication device, and able to select from among the following possibilities as a function of the value of the number, the possibility to establish a call or data transmission to a communication network if the number does not correspond to a predetermined code; else if the number corresponds to a predetermined code, the possibility to activate a function at the base station, or to establish a new configuration for the base station, or to query on information on the base station. Also described is a related communication method.

18 Claims, 4 Drawing Sheets

(51) Int. Cl.
*H04M 1/652* (2006.01)
*H04M 1/64* (2006.01)

(56) References Cited

U.S. PATENT DOCUMENTS

| | | | |
|---|---|---|---|
| 4,811,377 A * | 3/1989 | Krolopp et al. | 455/550.1 |
| 4,905,272 A * | 2/1990 | Van de Mortel et al. | 455/410 |
| 4,941,203 A * | 7/1990 | Patsiokas et al. | 455/517 |
| 5,068,889 A * | 11/1991 | Yamashita | 455/411 |
| 5,379,339 A * | 1/1995 | Sakamoto | 455/461 |
| 5,388,212 A * | 2/1995 | Grube et al. | 726/22 |
| 5,457,737 A * | 10/1995 | Wen | 455/410 |
| 5,528,666 A | 6/1996 | Weigand et al. | |
| 5,539,803 A * | 7/1996 | Bhat et al. | 379/21 |
| 5,689,549 A * | 11/1997 | Bertocci et al. | 455/463 |
| 5,850,601 A * | 12/1998 | Aida et al. | 455/426.1 |
| 5,953,656 A | 9/1999 | Bertocci | |
| 5,963,624 A * | 10/1999 | Pope | 379/110.01 |
| 6,094,146 A * | 7/2000 | Sharpe | 340/7.43 |
| 6,101,401 A * | 8/2000 | Mou et al. | 455/564 |
| 6,748,228 B1 * | 6/2004 | Izaki et al. | 455/462 |
| 6,959,172 B2 * | 10/2005 | Becker et al. | 455/74 |
| 2002/0058498 A1 * | 5/2002 | Beamish et al. | 455/411 |
| 2003/0195044 A1 * | 10/2003 | Narita | 463/43 |
| 2003/0217168 A1 * | 11/2003 | Adachi et al. | 709/229 |
| 2004/0209598 A1 * | 10/2004 | Beamish et al. | 455/410 |
| 2005/0239463 A1 | 10/2005 | Lagnado | |
| 2006/0015556 A1 | 1/2006 | Pounds et al. | |

FOREIGN PATENT DOCUMENTS

| | | |
|---|---|---|
| EP | 0917333 | 5/1999 |
| GB | 2296630 | 7/1996 |
| JP | 62199132 | 9/1987 |
| JP | 63187928 | 8/1988 |
| JP | 4504787 | 8/1992 |
| JP | 2007046332 | 2/1995 |
| JP | 833040 | 2/1996 |
| JP | 2010215490 | 8/1998 |
| JP | 11355444 | 12/1999 |
| JP | 2000122977 | 4/2000 |
| JP | 2000134658 | 5/2000 |
| JP | 2003519966 | 6/2003 |
| JP | 2004140710 | 6/2004 |
| JP | 2005312039 | 11/2005 |
| JP | 2007523405 | 8/2007 |
| WO | WO9003068 | 3/1990 |
| WO | 0150706 | 7/2001 |
| WO | 02096138 | 11/2002 |
| WO | 2005072382 | 8/2005 |

OTHER PUBLICATIONS

Suzuki, Java World, Java SE6, Kaihatsu No Genba Special vol. 001, IDG, Japan, Dec. 2006, with a partial English translation.

* cited by examiner

CALL INTERCEPTION AT A BASE STATION

This application claims the benefit, under 35 U.S.C. §365 of International Application PCT/FR2008/050373, filed Mar. 5, 2008, which was published in accordance with PCT Article 21(2) on Oct. 2, 2008 in French and which claims the benefit of French patent application No. 0753873, filed Mar. 16, 2007 and French patent application No. 0757663, filed Sep. 19, 2007.

SCOPE OF THE INVENTION

The present invention relates to the domain of telecommunications.

The present invention relates more particularly to a base and a communication method between a portable communication device and a base, for the activation or non-activation of a functionality within the base.

PRIOR ART

Within the context of domestic wireless telephony, for example the ETSI DECT (Digital Enhanced Cordless Telecommunications) standard, a base is connected to one or more handsets. The base is also connected to a telephone network.

The Generic Access Profile (GAP) is defined in DECT. GAP is the basic DECT profile and is applied to the bases and DECT handsets. GAP defines a minimum and mandatory set of technical constraints between a DECT GAP base and a DECT GAP handset. This profile has been established by ETSI (European Telecommunications Standards Institute) as an important part of a set of DECT profiles. Each DECT compatible device must support one or more profiles to be functional.

The GAP set consists in a series of instructions to register (or unregister) handsets and make telephone calls. Additional functionalities, such as for example the identification of the number of the caller, an integrated voice mail or the programming of the base, are not part of this GAP set and are not subject to standardisation.

The purpose of GAP is to provide the interoperability between bases and handsets of different manufacturers, but GAP only covers very basic functionalities.

For example, the access to the integrated voice mail system in the base from a handset is not standardised. There are major problems of compatibility between handsets and bases from different manufacturers. The integrated voice mail functionality in a base of a manufacturer F1 will not be able to be accessed from a handset of a manufacturer F2.

Moreover, with the devices of the prior art, when a new functionality must be implemented, a new specific software must be developed for the handset.

SUMMARY OF THE INVENTION

The technical problem that the present invention proposes to resolve consists in enabling a handset to have access to functionalities present on a base, even if the handset and the base are not from the same manufacturer and even if these functionalities are not standardised in the GAP profile.

By introducing the interception of calls at the level of the base, it is possible to enter a particular mode by "fooling" the handset into believing that it is connected to the exterior (or not) and to enter the voice and/or textual guide at the level of the base. This operation is realised by means of the caller identification functionality: the base recognises the destination of the call and can thus intercept this call. This allows the handset to be given access to all the functionalities present at the level of the base, even if the handset is not aware of the existence of these functionalities. This also enables the handsets of other manufacturers to be used.

Preferably, the interception of calls at the level of the base is realised by using a pre-dialling mode, which enables "false triggers" to be avoided.

The present invention concerns, in its most widely accepted sense, a base, able to communicate with a portable communication device and to be connected to a communication network, characterized in that it comprises:
  means for receiving a number from a portable communication device,
  means for selecting among the following possibilities, according to the value of said number:
    a) if said number corresponds to a predetermined code:
      i) activation of a functionality at the level of the base, or
      ii) establishment of a new configuration of the base, or
      iii) consultation of information on the base, or
    b) a call or data transmission to a communication network is set up if said number does not correspond to a predetermined code.

Preferably, the base does not off-hook, no call is set up and no data is transmitted to an external communication network if said number corresponds to a predetermined code.

According to an embodiment, said functionality is the voice mail.

Advantageously, said base comprises means for receiving commands related to said functionality from said portable communication device and means for executing these commands.

Preferably, said base further comprises means for setting up a connection between the portable communication device and the communication network.

The present invention also relates to a communication method, comprising the following steps:
  a) setting up of a connection between a base and a communication device, characterized in that it further comprises the following steps:
  b) the base waits for a period of $T_f$ milliseconds to receive a number from said communication device,
  c) the base examines the received number, selects from among the following possibilities:
    if the number corresponds to a predetermined code:
      i) activation of a functionality, or
      ii) establishment of a new configuration of the base, or
      iii) consultation of information on the base, or
    a call or data transmission to a communication network is set up if said number does not correspond to a predetermined code.

Preferably:
  i. the base does not off-hook and the number is not sent to a telephone network if the number corresponds to a predetermined code, and/or
  ii. the base off-hooks and the number is sent to a telephone network if the number does not correspond to a predetermined code.

According to an embodiment, said functionality is the voice mail.

According to a particular implementation, $T_f$ can be comprised between 285 ms and 315 ms. This value can vary according to the applications.

Advantageously, said communication method further comprises, if the number corresponds to a predetermined code, a step of transmitting at least one command of the portable communication device to the base as well as a step of executing these commands at the level of the base.

BRIEF DESCRIPTION OF THE DRAWINGS

The invention will be better understood from the following description of an embodiment of the invention provided as an example by referring to the annexed figures, wherein.

DETAILED DESCRIPTION OF THE EMBODIMENTS OF THE INVENTION

An item of portable equipment (EP) or handset is linked by means of a wireless communication means to a base or access point (PA) that can communicate over a telephone network.

Figure 1:
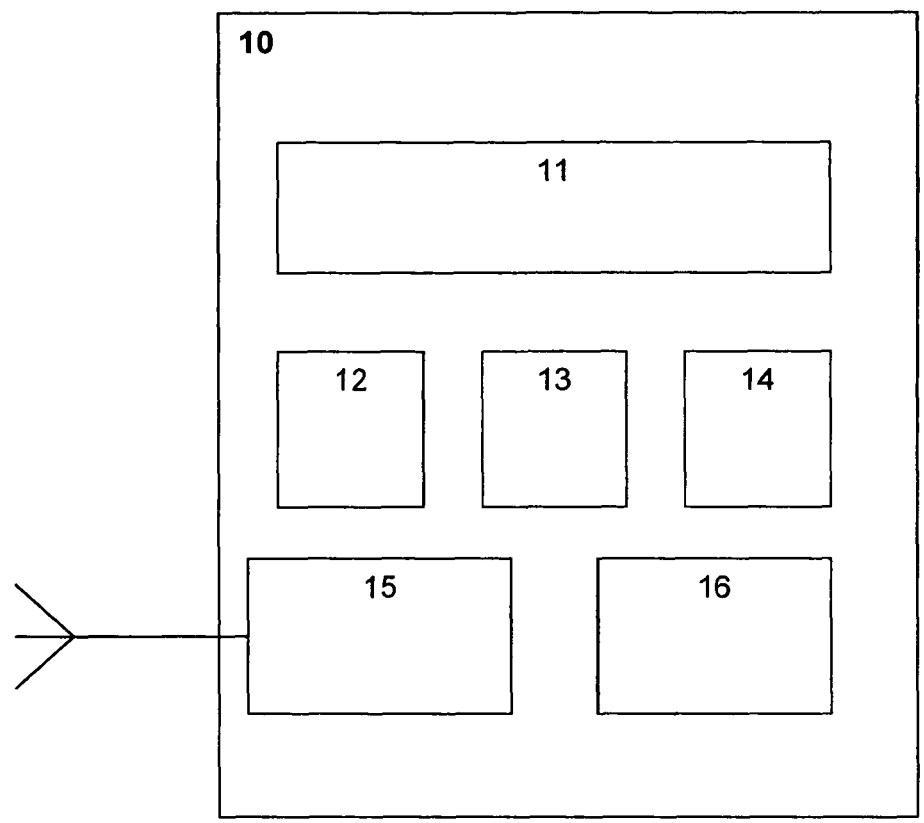
FIG. 1 illustrates an item of portable equipment (EP) or handset.

The portable equipment EP (10), shown in FIG. 1, is comprised in part by the following elements and functionalities:
- a set of input/output peripheral devices (11): display, keyboard, loudspeaker,
- a processor (12),
- a non-volatile memory (13) containing the code and the software data ensuring the operation of the equipment,
- a volatile memory (14) containing data that is "variable" in time,
- a wireless link (15) for the connection to a base,
- an accumulator block (16) ensuring the power supply of the equipment.

Figure 2:
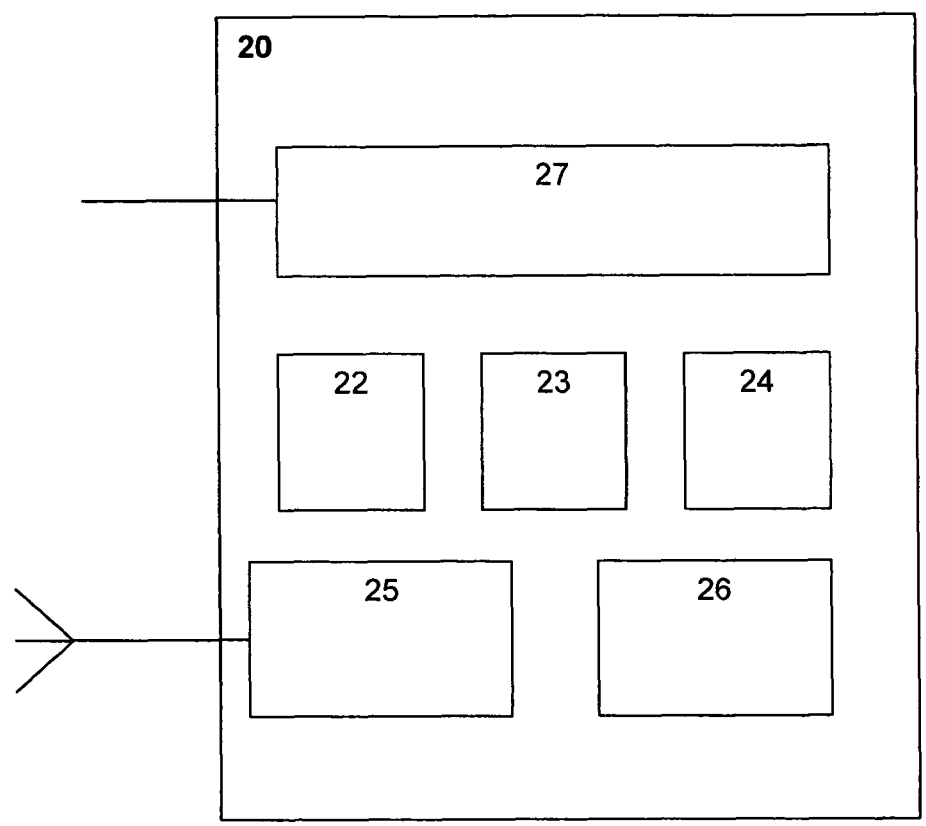
FIG. 2 illustrates a base or access point PA.

The base (or access point PA) 20 shown in FIG. 2 is partly constituted by the following elements and functionalities:
- a processor (22),
- a non-volatile memory (23) containing the code and the software data ensuring the operation of the base,
- a volatile memory (24) containing data that is "variable" in time,
- a wireless link (25) for the connection to a handset,
- an accumulator block (26) ensuring the power supply of the equipment, and
- a wired link (27) for the access to a telephone network.

Figure 3:
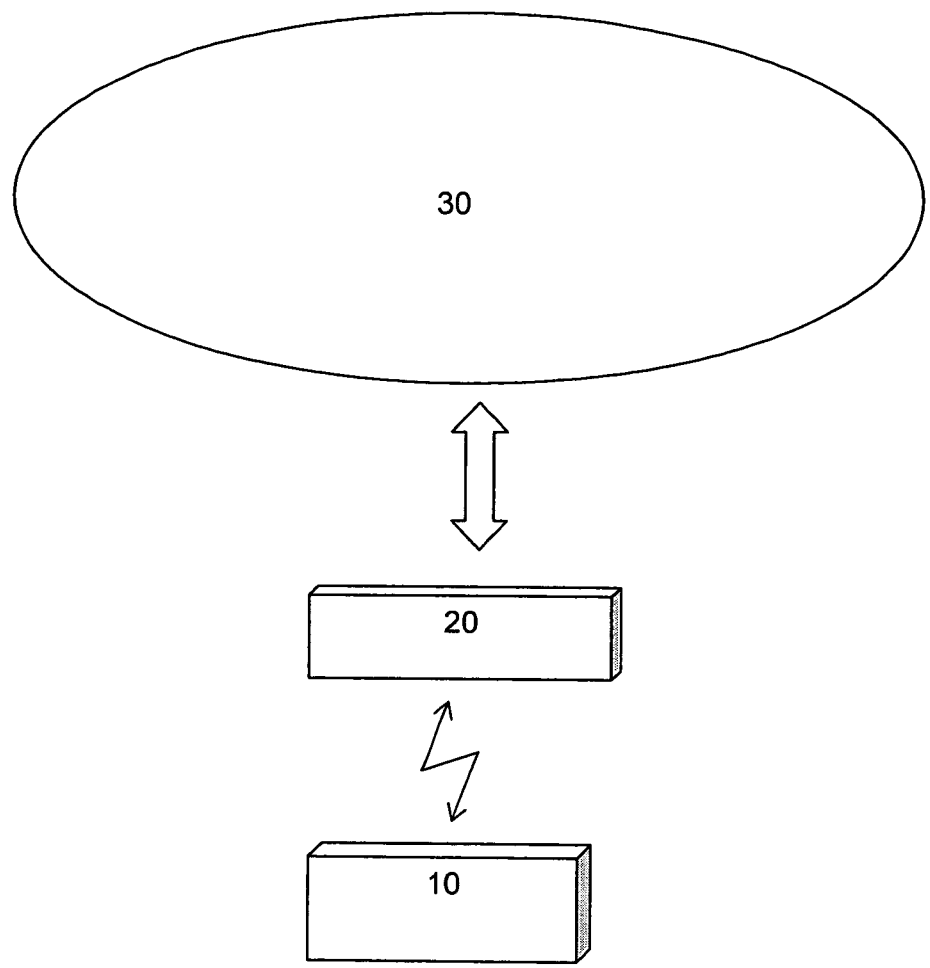
FIG. 3 shows an access point architecture (PA-base) <-> portable equipment (EP-handset) architecture.

The general architecture of the system, shown in FIG. 3, is composed of the following elements:
- an item of portable equipment EP (10) connected via a wireless link, to
- a base 20, itself linked to a telephone network 30.

The link between the base 20 and the item of portable equipment EP 10 can for example be of the DECT, Wi-Fi or Bluetooth type.

Hereafter, a description of the invention will be made within the context of the voice mail. It is understood that the present invention can be applied to any functionality on a base and not only the voice mail.

Within the context of the present invention, the portable equipment sends the access point a predetermined code, which is recognised by the access point and which triggers, at the level of the access point, the launch of the voice mail functionality. It is for example possible to pre-dial ** followed by the dial button on the item of portable equipment. The access point triggers a remote access mode without dialling and without requesting an access code.

Hence, an item of portable equipment can consult voice messages and record a voice announcement on the access point, without it being necessary to develop a specific software application for the item of portable equipment. Any item of GAP compatible DECT portable equipment from any manufacturer can operate with the voice mail of the access point. The item of portable equipment can for example interact with the voice mail of the access point by means of a voice guide, which, played on the earpiece or the loudspeaker of the item of portable equipment, will provide the user with instructions for using the voice mail. The latter can then press the keys of the item of portable equipment to access the different functions of the voice mail: playing messages, erasing messages, recording an announcement, etc.

Table 1 shows an example of functions of the voice mail to which the user has access by using the keypad of the item of portable equipment.

TABLE 1

| DTMF code | Operation |
|---|---|
| * | Enter the remote access mode/ Return to the main menu |
| 1 | Listen to the new messages |
| 2 | Listen to the old messages |
| 3 | Record an announcement message |
| 4 | Go to the previous message when listening to messages |
| 5 | Pause when listening to messages |
| 6 | Go to the next message when listening to messages |
| 7 | Modify the answer mode |
| 9 | Erase one or more messages according to the position in the menu |
| 0 | Modify the access code remotely |

Every GAP compatible handset has a pre-dialling functionality that enables a number to be dialled without off-hooking.

In the case of pre-dialling, the communication between the base (access point) and the handset (portable equipment) is set up as follows:
1) a connection is set up between the handset and the base,
2) the handset sends the base a pre-dialled number,
3) the number is extracted by the base and the base off-hooks,
4) the base waits for the tone, and
5) the base sends the number to the telephone network.

In order to enable the base to recognize the code that will activate the voice mail, or any other functionality present on the base, the software of the base must enter into a different operation from the operation described above.

Once the connection is set up between the handset and the base, the base enters the following operating mode:
1) waiting for a period of $T_f$ milliseconds, for example 300 ms, to receive the number
2) examination of the number received and selection among the following possibilities:
   a) If the number corresponds to a predetermined code, the base activates the voice mail (or another functionality). The base does not off-hook and the number is not sent to the telephone network
   b) If the number does not correspond to a predetermined code, the base does not activate the voice mail (or the functionality that corresponds to the predetermined code). The base off-hooks and the number is sent to the telephone network.

If the received code corresponds to a predetermined code, it is also possible to set up a new configuration of the base or else carry out an information consultation operation on the base, instead of activating a functionality.

The setting up of a new configuration of the base can be followed, or not, by an acknowledgement. This acknowledgement can be visual or audible, on the base or on the handset.

The consultation of information on the base can also be followed, or not, by an acknowledgement, visual or audible, on the base or on the handset.

Figure 4:
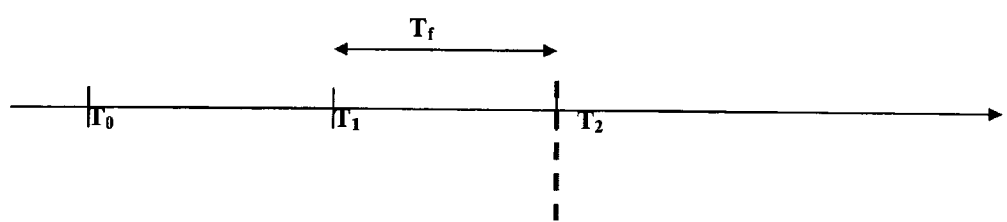
FIG. 4 illustrates the process, as a function of time, comprising the following steps: dialling a number at the level of the portable equipment (EP), transmitting this number to the access point (PA) and activating or not activating a functionality by the access point (PA).

FIG. 4 illustrates the process, as a function of time, comprising the following steps: dialling of a number at the level of the handset, transmitting this number to the base and activating or not activating a functionality by the base.

In FIG. 4:
$T_0$ designates the time at which the communication set-up request is transmitted to the base, with a number.
$T_1$ designated the time at which the connection between the handset and the base is set up.
The number is transmitted to the base shortly after the connection is set up.
For $T_f$, milliseconds, the base waits then analyses the number sent by the handset.
At time $T_2$: after $T_f$, milliseconds, the base decides to activate the voice guide of the voice mail on the handset if the number received corresponds to a predetermined code or else sends the number to the telephone network if the received number does not correspond to a predetermined code.

Hence, the voice guide of the voice mail is only played on the handset in the case where the number received corresponds to a predetermined code.

In a particular implementation, if the number is sent before or after a period of time dedicated to the analysis of the number, the code may not be recognised. Consequently, the voice mail, or the other functionality, will not be activated at the level of the handset.

In the case where the number is recognised, the handset continues to send data to the base and this data received by the base is considered as a command at the level of the base, which executes it.

During the execution of a functionality, the base can be available or else not be available to receive calls, according to the implementation chosen. In the case of the voice mail, it can be considered that only the "intercepted" handset is not available to receive external calls at the time of the communication with the base.

The present invention applies to any functionality integrated into the base, and not only to the voice mail. For example, in Russia, to identify the number of the caller, it can be necessary to modify the number of requests of the number, the duration of this request, etc. It is possible to present each configuration parameter by the unique number on this base. To change, for example, the number of attempts, #0000#12 is pre-dialled on the handset. Here, 0000 corresponds to the access code to the base configuration. 1 corresponds to the configuration parameter number 1—the number of attempts, and 2 corresponds to its new value—number of attempts to determine the number. This use enables the same handset to be adapted in several countries without having to develop a software application specific to each country for the handset.

In each country, the waiting time between the off-hooking time and dialling is standardised. However, the base can be behind a PABX and, in this case, the standardised waiting time is not sufficient. For pre-dialling, the first figures are not sent over the telephone network, as the PABX takes much more time to set up the link with the network. To modify this waiting time, it will be considered that the waiting time before dialling must be identified by the number 5. The waiting time before dialling is 3 seconds and to establish the connection, it must be changed to 4 seconds. For this, ##5#4# is pre-dialled on the handset; the "off-hook" key is pressed. This sequence is transmitted to the base, intercepted and the waiting time changes from 3 seconds to 4.

'##' corresponds to the configuration start sequence.
5 corresponds to the parameter number 5—the waiting time before dialling.
corresponds to the separator between the number of the parameter and its value
4 corresponds to the waiting time—4 seconds
Terminates the configuration sequence.

The invention is described in the preceding text as an example. It is understood that those skilled in the art are capable of producing variants of the invention without leaving the scope of the patent.

The invention claimed is:

1. An apparatus comprising:
a first wireless link configured to wirelessly communicate with a portable communication device;
a second wireless link configured to connect to an external communication network;
a memory;
at least one processor to:
detect, via said first wireless link, a dialed number from said portable communication device;
identify whether said dialed number corresponds to a predetermined number stored in the memory;
change a configuration of said apparatus, said configuration being associated with the predetermined number, when the dialed number corresponds to said predetermined number, such that a behavior of the apparatus corresponding to the configuration is changed; and
set up a call or data transmission over the external communication network using said second wireless link, when said dialed number does not correspond to said predetermined number stored in said memory.

2. The apparatus according to claim 1, wherein the at least one processor is further configured to prevent off-hook such that no call is set up and no data is transmitted to the external communication network, if said dialed number corresponds to said predetermined number stored in said memory.

3. The apparatus according to claim 1, wherein said behavior comprises off-hooking and dialing.

4. The apparatus according to claim 1, said behavior comprises identifying a number of a caller.

5. The apparatus according to claim 1, wherein the processor is further configured to set up a connection between the portable communication device and the external communication network.

6. The apparatus according to claim 1, wherein to change the configuration the at least one processor is configured to send information associated with the apparatus.

7. The apparatus according to claim 1, wherein said apparatus and said portable communication device are compliant with ETSI (European Telecommunications Standards Institute) DECT (Digital Enhanced Cordless Telecommunications) standard.

8. The apparatus according to claim 1, wherein the first wireless link is configured to communicate wirelessly in accordance with DECT (Digital Enhanced Cordless Telecommunications), WiFi or Bluetooth.

9. The apparatus according to claim 1, further comprising, if the dialed number corresponds to the predetermined number, receiving, via said first wireless link, at least one command of the portable communication device and executing the at least one command.

10. A communication method, the method comprising:
- setting up, by a base station, a connection, using a first wireless link, between said base station and a portable communication device;
- detecting, by the base station, a dialed number from said portable communication device;
- identifying, by the base station, whether said dialed number corresponds to a predetermined number stored in the base station;
- changing, by the base station, a configuration of the base station, said configuration being associated with the predetermined number, when the dialed number corresponds to said predetermined number, such that a behavior of the base station corresponding to the configuration is changed; and
- setting up, by the base station, a call or data transmission over an external communication network using a second wireless link, if the dialed number does not correspond to the predetermined number stored in said base station.

11. The communication method according to claim 10, further comprising:
- precluding, by the base station, execution of an off-hook such that the dialed number is not sent to said external communication network, if the dialed number corresponds to a predetermined code stored in said base station.

12. The communication method according to claim 10, wherein the behavior comprises off-hooking and dialing.

13. The communication method according to claim 10, further comprising, if the dialed number corresponds to the predetermined number stored in said base station, receiving, by the base station via said first wireless link, at least one command of the portable communication device and executing the at least one command in the base station.

14. The communication method according to claim 10, wherein the first wireless link is configured to communicate wirelessly in accordance with DECT (Digital Enhanced Cordless Telecommunications), WiFi or Bluetooth.

15. The method according to claim 10, wherein said behavior comprises identifying a number of a caller.

16. The method according to claim 10, further comprising setting up a connection between the portable communication device and the external communication network.

17. The method according to claim 10, wherein changing the configuration further comprises sending information associated with the base station.

18. The method according to claim 10, wherein said base station and said portable communication device are compliant with ETSI (European Telecommunications Standards Institute) DECT (Digital Enhanced Cordless Telecommunications) standard.

* * * * *